United States Patent
Maronati et al.

(10) Patent No.: US 12,313,136 B2
(45) Date of Patent: May 27, 2025

(54) VENTILATED BRAKE ROTOR

(71) Applicant: BREMBO S.p.A., Curno (IT)

(72) Inventors: Gianluigi Maronati, Curno (IT); Alberto Bosis, Curno (IT)

(73) Assignee: Brembo S.p.A., Bergamo (IT)

( * ) Notice: Subject to any disclaimer, the term of this patent is extended or adjusted under 35 U.S.C. 154(b) by 363 days.

(21) Appl. No.: 17/757,484

(22) PCT Filed: Dec. 15, 2020

(86) PCT No.: PCT/IB2020/061926
§ 371 (c)(1),
(2) Date: Jun. 16, 2022

(87) PCT Pub. No.: WO2021/124084
PCT Pub. Date: Jun. 24, 2021

(65) Prior Publication Data
US 2023/0008271 A1    Jan. 12, 2023

(30) Foreign Application Priority Data
Dec. 18, 2019    (IT) .......................... 102019000024520

(51) Int. Cl.
*F16D 65/12*    (2006.01)
*F16D 65/00*    (2006.01)
(Continued)

(52) U.S. Cl.
CPC ....... *F16D 65/128* (2013.01); *F16D 65/0081* (2013.01); *F16D 65/10* (2013.01);
(Continued)

(58) Field of Classification Search
CPC .... F16D 65/10; F16D 65/128; F16D 65/0081; F16D 2065/1328
See application file for complete search history.

(56) References Cited

U.S. PATENT DOCUMENTS 5,671,827 A * 9/1997 Demetriou ............ F16D 65/847
188/73.46
2014/0069752 A1   3/2014 Fakhoury
(Continued)

FOREIGN PATENT DOCUMENTS

DE    102005035815 A1    2/2007
EP        1426644 A2    6/2004
WO       03067112 A1    8/2003

OTHER PUBLICATIONS

European Patent Office, International Search Report, issued in PCT/IB2020/061926, Feb. 17, 2021, Rijswijk, NL.

*Primary Examiner* — Vishal R Sahni
(74) *Attorney, Agent, or Firm* — Marshall & Melhorn, LLC

(57) ABSTRACT

A ventilated brake rotor rotationally associated with a vehicle element to be braked, having a rotation axis and defining an axial direction, parallel to or coinciding with the rotation axis, a radial direction perpendicular to the axial direction and a circumferential direction, perpendicular to both the axial and radial directions, has a cup-shaped body having at least one ventilation opening passing through a cup-shaped body thickness to allow passage of a cooling fluid for cooling the ventilated brake rotor, at least one front annular portion for connecting the ventilated brake rotor to the vehicle element to be braked, and a side portion extending from the at least one front annular portion at least in the axial direction. A protective element shields the at least one ventilation opening preventing foreign bodies from entering into the cup-shaped body and allowing the cooling fluid to cross the at least one ventilation opening.

11 Claims, 18 Drawing Sheets

(51) Int. Cl.
*F16D 65/10* (2006.01)
*F16D 65/02* (2006.01)

(52) U.S. Cl.
CPC ............... *F16D 2065/1316* (2013.01); *F16D 2065/1328* (2013.01)

(56) References Cited

U.S. PATENT DOCUMENTS

2016/0017947 A1 1/2016 Fakhoury
2018/0031059 A1* 2/2018 Gelb ................... F16D 65/0031

\* cited by examiner

VENTILATED BRAKE ROTOR

CROSS-REFERENCE TO RELATED APPLICATIONS

This application is a National Phase Application of PCT International Application No. PCT/IB2020/061926, having an International Filing Date of Dec. 15, 2020 which claims priority to Italian Application No. 102019000024520 filed Dec. 18, 2019, each of which is hereby incorporated by reference in its entirety.

FIELD OF THE INVENTION

The present invention relates to a ventilated brake rotor and a ventilated type brake, particularly, but not exclusively, for applications in the automotive field, for example in the field of drum-in-hat brakes.

BACKGROUND ART

In a ventilated type brake, depending on whether it is a disk brake or a drum brake, the bell of the brake disk, the rotating drum, or the fixed jaw holder plate of a drum brake, comprise ventilation portions which allow the passage of an air flow which increases the thermal exchange and accelerates the cooling process of a brake of a vehicle.

The ventilation portions are portions of the drum, the fixed plate or the bell which generally comprise through ventilation openings defining aeration pipes.

Such openings are usually arranged circumferentially so that turbulent air movements accelerating the cooling of the brake are triggered inside the bell or drum.

Instead, when such openings are obtained on the fixed plate of a drum brake, they usually are in the shape of aeration windows and/or aeration holes.

It has been found that in some circumstances of vehicle travel, in addition to the air, solid foreign bodies can also pass through such ventilation openings and become trapped inside the drum or in the gap between the bell and the wheel hub.

In particular, the passage of foreign bodies through the ventilation openings, besides affecting the level of cleanliness, can cause damage, for example to the parts of ABS systems, bearings, as well as to the internal parts of a brake, such as a drum brake, for example, or a drum parking brake housed inside the bell of a disk brake of commercial vehicles.

Moreover, foreign bodies, such as small stones, for example, can become locked inside the ventilation pipes, obstructing the passage of air, and thus compromising the cooling of the brake.

Furthermore, the trapping of foreign bodies inside the rotating part of the brake is a source of noise, which causes annoyance to vehicle users and road users.

It has been found that components arranged inside ventilated drums or ventilated bells have increased wear as compared to components arranged inside non-ventilated drums or bells, and therefore it was found that vehicles with ventilated type bells or drums have higher maintenance costs than vehicles with non-ventilated bells or drums.

From the prior art, ventilated drum brakes are known for competition motorcycles, produced between 1960 and 1980, for example, by the companies Ceriani, Fontana and Oldani, where on the fixed jaw holder plate, a ventilation window of large dimensions facing the direction of travel and a plurality of axial ventilation openings are provided. In such brakes, the ventilation window is covered by a perforated metal sheet, while the axial ventilation openings have no covering.

Such ventilated drum brakes only partially overcome the mentioned problems, including a perforated cover arranged on the ventilation window and thus preventing foreign bodies from entering into the drum brake, but leaving the axial ventilation openings devoid of any protection. Therefore, foreign bodies can still enter passing through the axial ventilation openings.

Moreover, in addition to only partially overcoming the mentioned problems, such solutions exclusively concern ventilated brakes having ventilation openings on the fixed part of the drum brake.

Therefore, the need is strongly felt to provide a ventilated brake rotor which allows the drawbacks known from the prior art to be overcome, without compromising the cooling performance, as well as the operating performance.

Additionally, the need is felt to obtain a simple ventilated rotor, with as few components as possible, which is cheap and/or easy to manufacture from ventilated brakes already commercially available at the lowest possible cost.

Not least, the need is felt to obtain ventilated brake rotors of vehicles which, on the one hand, are particularly durable, and on the other allow to reduce the brake maintenance.

Therefore, the problem underlying the present invention is the devising of a ventilated brake rotor and a brake, which have such structural and functional features to meet the aforesaid needs, while obviating the drawbacks mentioned with reference to the prior art and meet the aforesaid felt needs.

SOLUTION

It is the object of the present invention to provide a ventilated brake rotor which functions as a protection for the components of a vehicle or a brake placed close to the ventilated rotor.

It is the object of the present invention to obtain a ventilated brake rotor in which the possibility of foreign bodies entering into the ventilation openings is reduced, and in which the cooling properties are maintained with a solution which is as simple and easy as possible to implement in the step of manufacturing.

This and other objects and advantages are achieved by a ventilated brake rotor, a brake and a vehicle as described and claimed herein.

Some advantageous embodiments are the subject of the dependent claims.

The suggested solution maintains a very high brake rotor cooling efficiency.

Furthermore, the suggested solutions prevent the access of foreign bodies with respect to at least one ventilation opening but leaving the passage free for a cooling fluid by providing only one additional protective element as compared to ventilated brake rotors of the known type.

The protective element has a lower thickness than the thickness of the cup-shaped body of the ventilated rotor on which the ventilation openings are obtained, which substantially form ventilation pipes having a length equal to the thickness of the cup-shaped body of the ventilated brake rotor.

Again, the protective element is made in a separate piece with respect to the cup-shaped body of the ventilated brake rotor.

Moreover, the protective element is reversibly removable from the cup-shaped body of the rotor, thus the protective element can easily be cleaned, disassembled, and reassembled, or replaced during the maintenance of the ventilated brake.

Furthermore, the protective element is an annular protective element, which, due to the shape thereof which is complementary to a cup-shaped body portion, is connected and constrained to the cup-shaped body without using further fixing elements.

Still further, due to the suggested solutions, it is possible to obtain a ventilated rotor without needing to introduce laborious and complicated assembly operations.

FIGURES

Further features and advantages of the ventilated brake rotor, the brake and the vehicle will become apparent from the following description of preferred embodiments thereof, given by way of non-limiting example, with reference to the accompanying figures, in which.

DESCRIPTION OF SOME PREFERRED EMBODIMENTS

Figure 1:
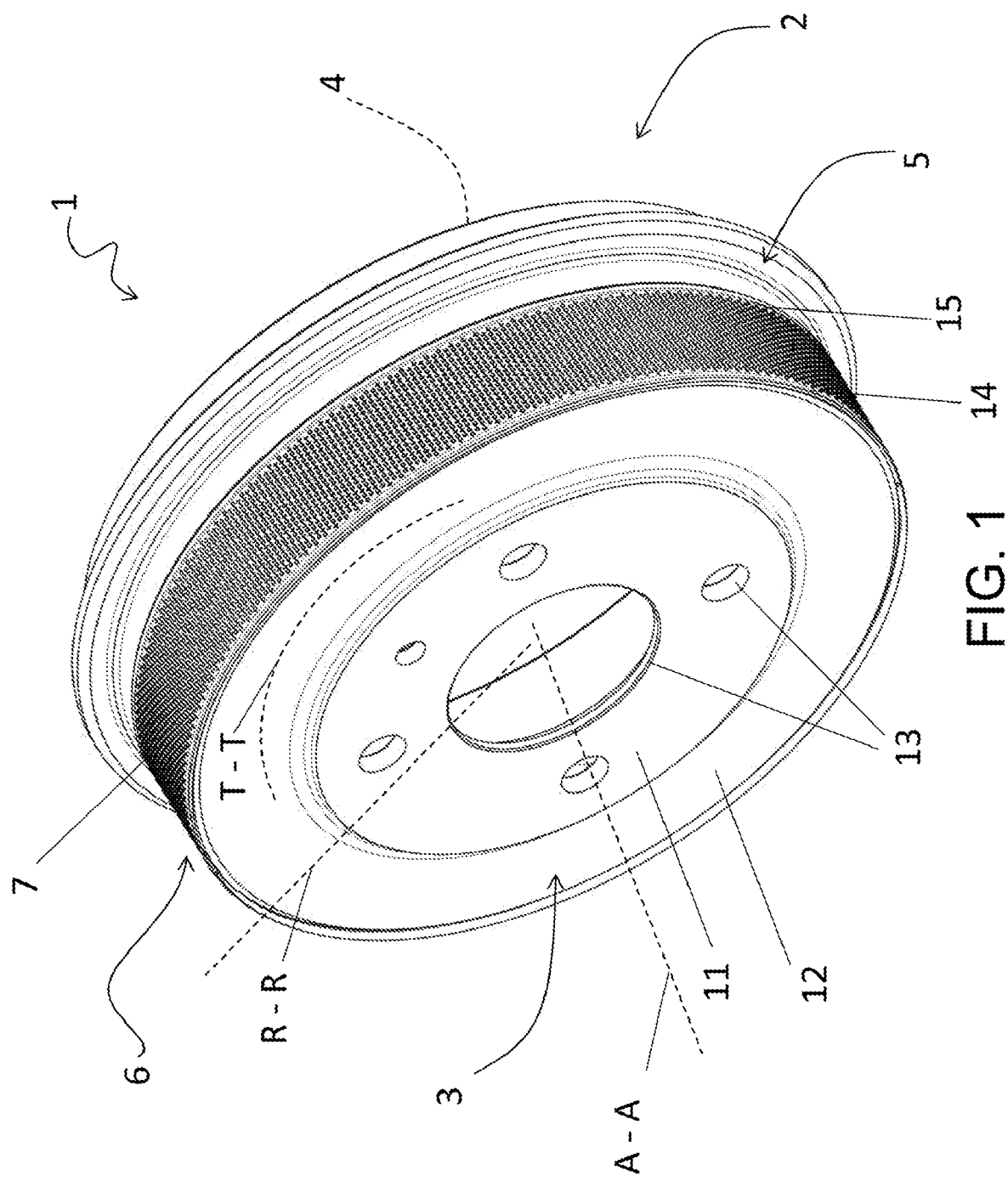
FIG. 1 is an axonometric view of a ventilated brake rotor comprising a protective element according to a first embodiment, where the ventilated brake rotor is a drum.
Figure 2:
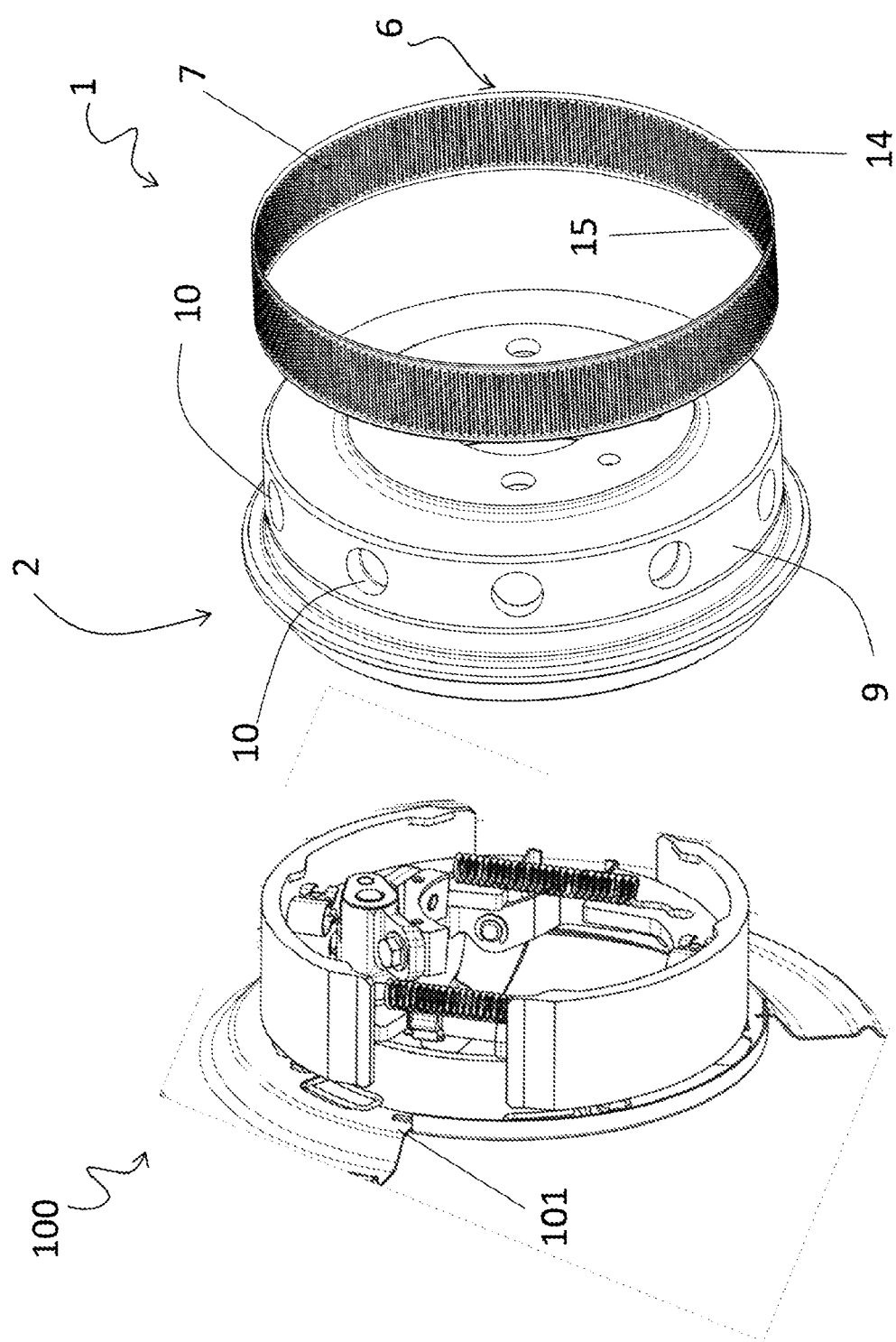
FIG. 2 is an exploded axonometric view of the ventilated brake rotor in FIG. 1 associated with a jaw holder plate of a drum brake.
Figure 3:
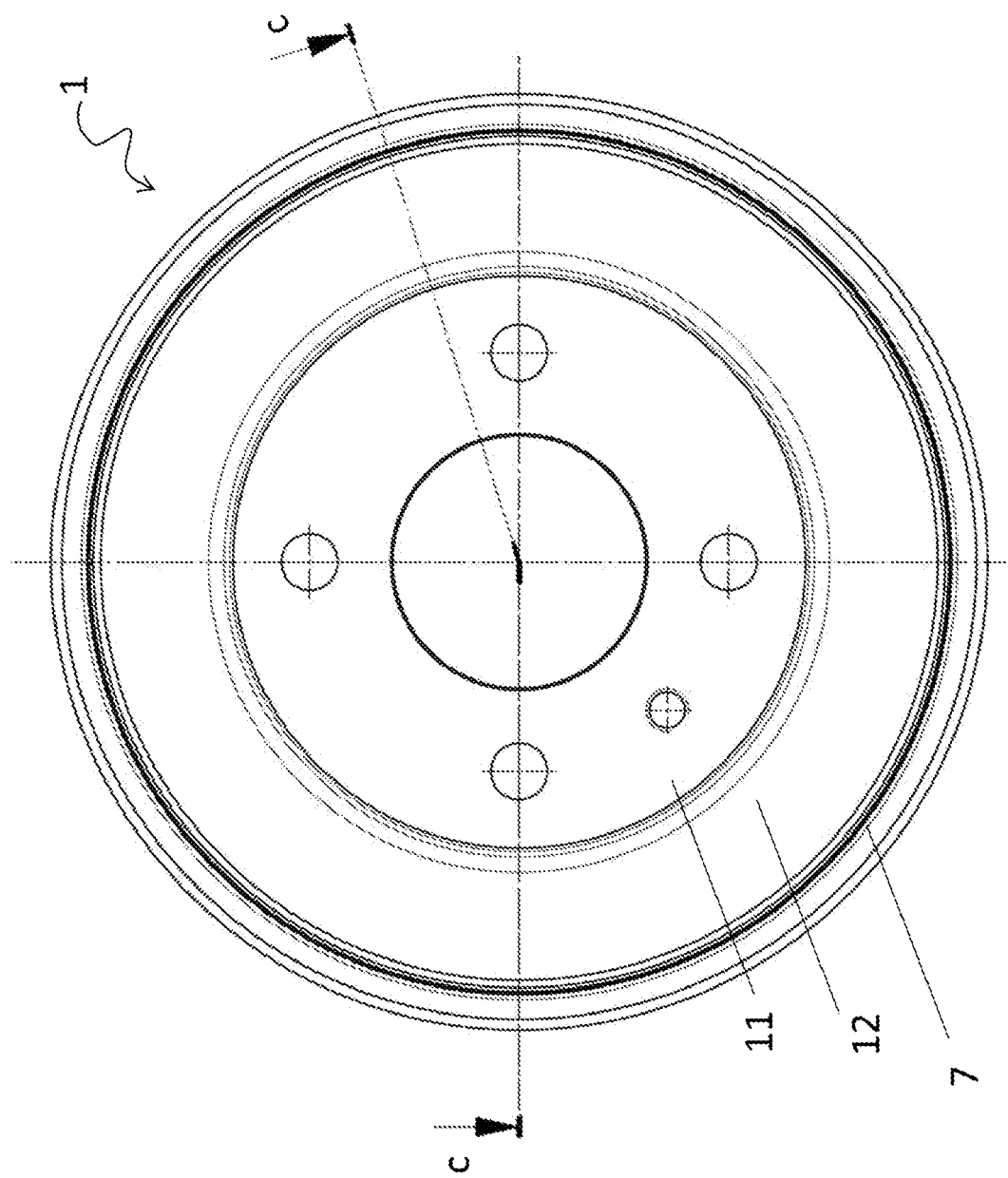
FIG. 3 is a front view of the ventilated brake rotor in FIG. 1.

A ventilated brake rotor 1 is provided according to a general embodiment.

The ventilated brake rotor (1) is rotationally associated with a vehicle element to be braked.

The ventilated rotor 1 has a rotation axis A and defines an axial direction A-A, parallel to, or coinciding with, the rotation axis A, a radial direction R-R and a circumferential direction T-T, where said radial direction R-R is perpendicular to said axial direction A-A and where said circumferential direction T-T is perpendicular to both said axial direction A-A and said radial direction R-R.

The ventilated rotor 1 comprises a cup-shaped body 2 which has a cup-shaped body thickness.

The cup-shaped body 2 comprises at least one ventilation opening 10, where each ventilation opening 10 passes through the cup-shaped body thickness so as to allow a cooling fluid to pass for cooling the ventilated brake rotor 1.

Furthermore, the cup-shaped body 2 comprises at least one front annular portion 3 and a side portion 5.

The front annular portion 3 is configured to connect the ventilated brake rotor 1 to said rotating element to be braked, and the side portion 5 extends from the front annular portion 3 at least in an axial direction A-A.

The ventilated brake rotor 1 comprises a protective element 6 configured to shield said at least one opening 10, preventing foreign bodies from entering into said cup-shaped body 2, while allowing the cooling fluid to cross said at least one opening 10.

According to an embodiment, the cup-shaped body 2 comprises a rear annular edge 4 which is axially opposite to the front annular portion 3, and the side portion 5 extends from the front annular portion 3 to the rear annular edge 4.

According to an embodiment, the cup-shaped body 2 is a containing body which defines an internal area therein and an external area thereout, where the cooling fluid passes through the ventilation opening between the area inside and the area outside the cup-shaped body.

According to an embodiment, the protective element 6 has a protective thickness, and the protective element thickness is smaller than the cup-shaped body thickness.

According to an embodiment, the at least one ventilation opening 10 is an opening of large dimensions passing through the cup-shaped body thickness. The protective element 6 is arranged partially covering said at least one opening 10, transforming the opening of large dimensions into a plurality of smaller openings.

Moreover, the ventilation opening 10 having large dimensions has a thickness equal to the cup-shaped body thickness, instead the plurality of openings of smaller dimensions have a smaller thickness, in particular equal to the protective element thickness.

According to an embodiment, said protective element 6 is configured to increase the drawing of the cooling fluid from the interior to the exterior of said cup-shaped body 2 through said at least one opening 10.

According to an embodiment, said protective element 6 has a plurality of ventilation holes 18.

The at least one ventilation opening 10, passing through the cup-shaped body thickness, substantially defines a pipe with a length equal to the cup-shaped body thickness and puts the area inside and the area outside the cup-shaped body 2 in communication. The protective element 6 is connected to the cup-shaped body 2 partially covering the ventilation opening 10 and reduces the size of the ventilation opening 10 with a plurality of smaller openings, for example a portion of the ventilation holes 18. Therefore, due to the presence of the protective element 6, the pipe defined by the ventilation opening 10 has a smaller section which accelerates the output cooling fluid and induces an increased thermal exchange between the area inside and the area outside of the cup-shaped body 2.

According to an embodiment, the protective element 6 is made in a separate piece with respect to the cup-shaped body 2.

According to an embodiment, the protective element 6 is removable from the cup-shaped body 2.

According to an embodiment, the protective element 6 comprises a perforated metal sheet.

According to an embodiment, the protective element 6 comprises at least one portion having a warp and weft configuration.

According to an embodiment, the protective element 6 is made of a metal material and/or a composite material.

According to an embodiment, the side portion 5 of the cup-shaped body 2 comprises at least one cylindrical crown 9 which peripherally extends in an axial direction from the front annular portion 3.

According to an embodiment, the front annular portion 3 comprises a radially inner circular crown 11 and a radially outer circular crown 12.

According to an embodiment, the radially inner circular crown 11 comprises a plurality of connection holes 13 configured to connect the ventilated rotor 1 to the element to be braked.

According to an embodiment, the element to be braked is the rotating element connected to a hub to which the ventilated brake rotor is rotationally constrained.

According to an embodiment, the cup-shaped body 2 comprises a plurality of said at least one ventilation opening 10.

According to an embodiment, the ventilation openings 10 are arranged on the cup-shaped body 2 along the circumferential direction T-T.

According to an embodiment, the ventilation openings 10 are neatly arranged on the cup-shaped body 2.

According to an embodiment, the protective element 6 is an annular protective element 7, 8.

According to an embodiment, the annular protective element 7, 8 has coupling means for locking said cup-shaped body 2.

Where the annular protective element 7, 8 has a central axis coinciding with the rotation axis A.

According to an embodiment, the annular protective element 7, 8 and the cup-shaped body 2 have a shape coupling so as to be axially, along a direction A-A, and radially, along a direction R-R, constrained, covering said at least one ventilation opening 10.

According to an embodiment, said annular protective element 7, 8 and the cup-shaped body 2 are constrained leaving the protective element 7, 8 free to rotate in a circumferential direction T-T. A rotation of the annular protective element 7, 8 can thus occur at a greater speed than the cup-shaped body 2 as the braking action gradually slows down the cup-shaped body 2, generating turbulent movements of the cooling fluid which increase the thermal exchange between the area inside and the area outside the cup-shaped body 2.

According to an embodiment, the ventilation openings 10 are radial ventilation openings, passing through said cup-shaped body 2 in a radial direction R-R.

According to an embodiment, the cylindrical crown 9 comprises said ventilation openings 10.

Figure 9:
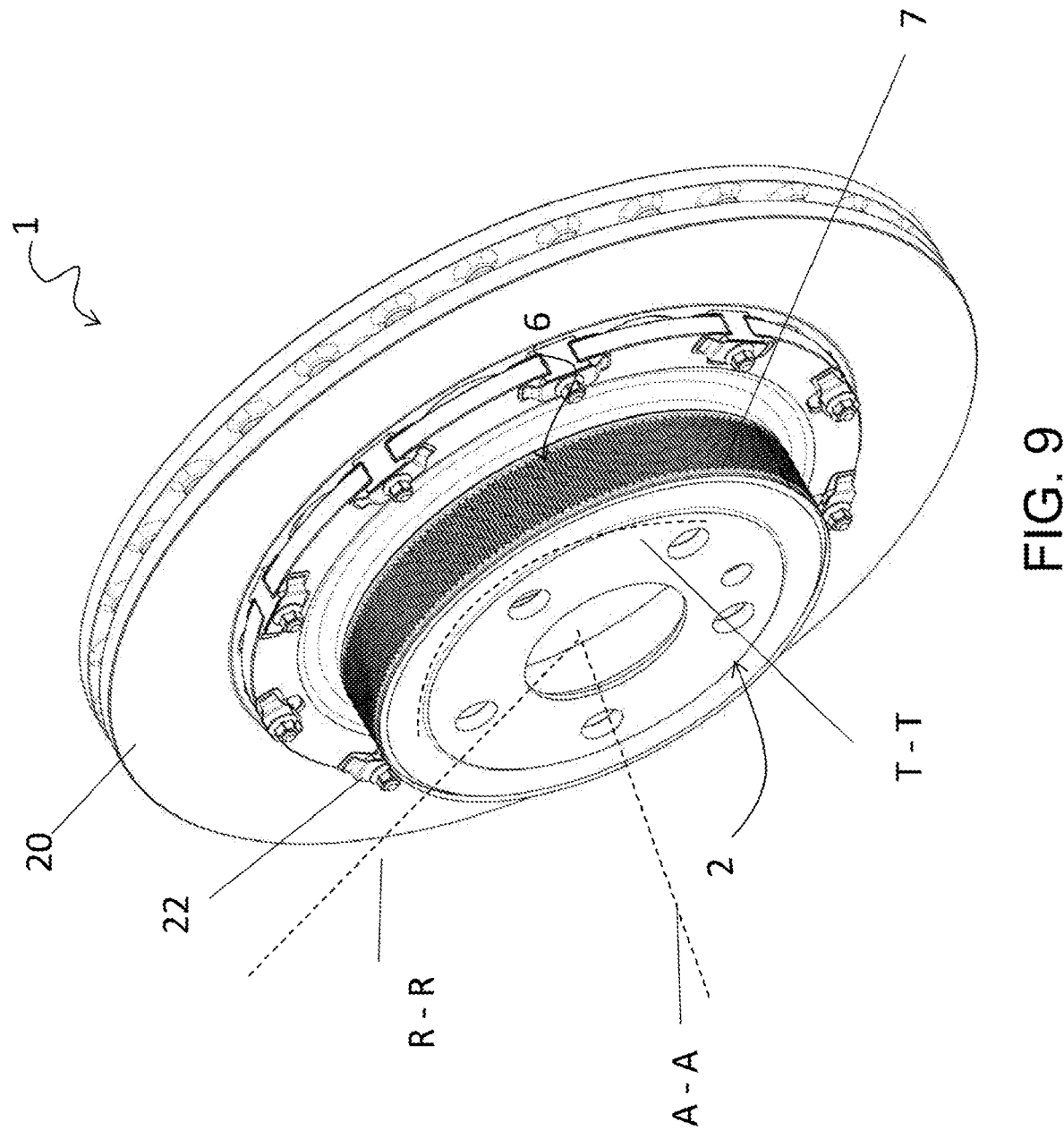
FIG. 9 is an axonometric view of a ventilated brake rotor comprising a protective element according to a third embodiment, where the ventilated brake rotor is a bell of a composite brake disk.
Figure 10:
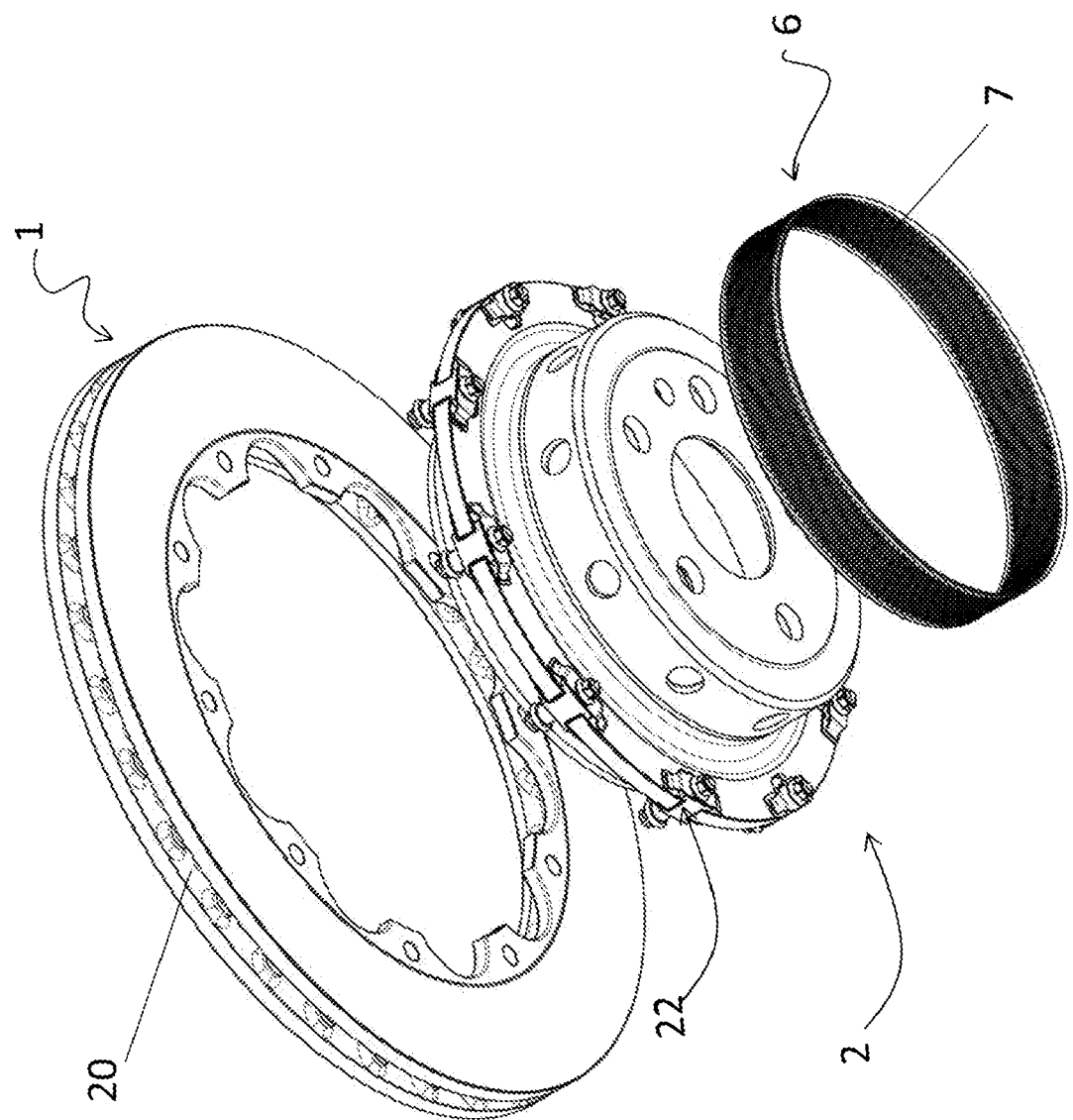
FIG. 10 is an exploded axonometric view of the ventilated brake rotor in FIG. 9.
Figure 13:
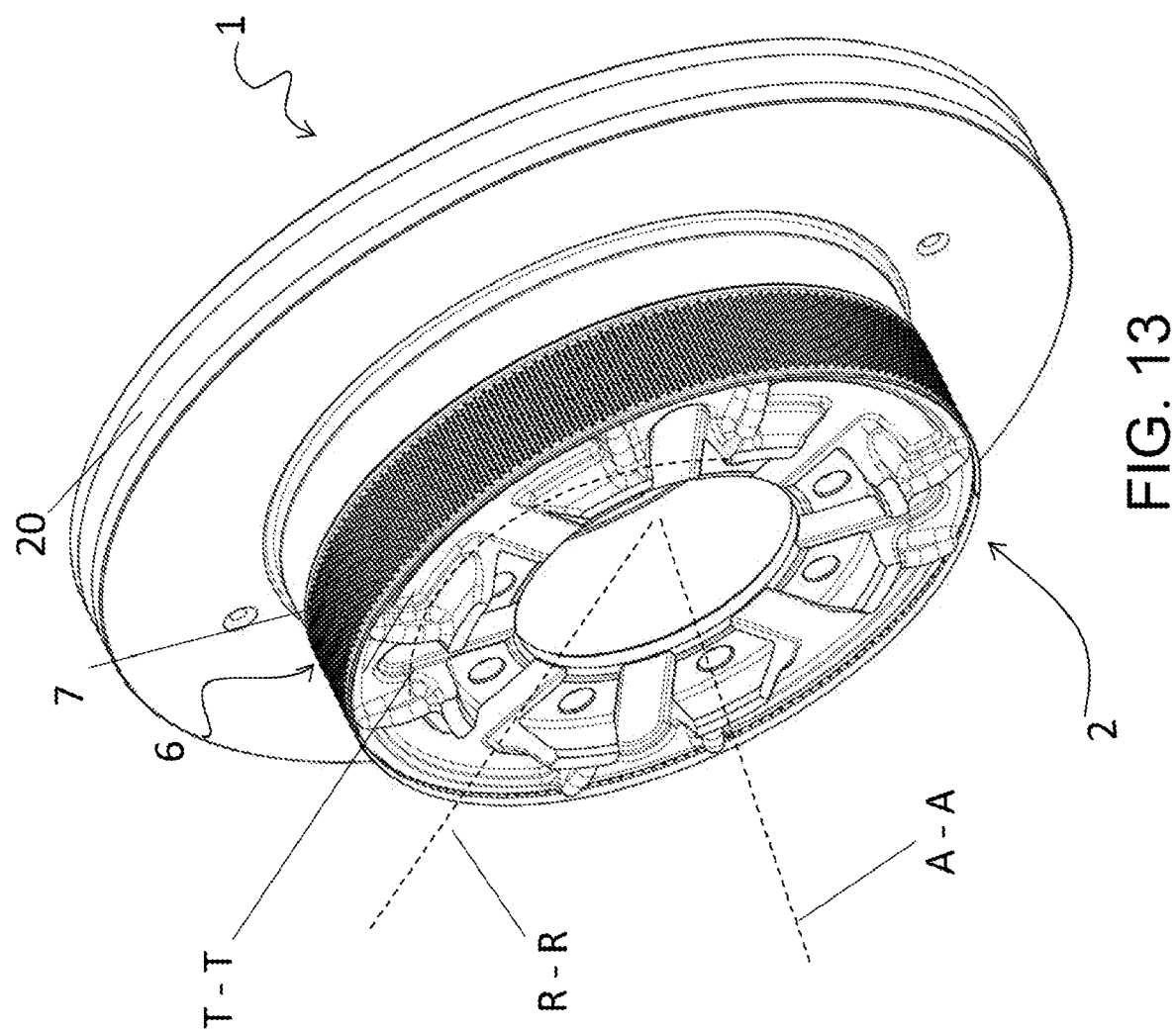
FIG. 13 is an axonometric view of a ventilated brake rotor comprising a protective element according to a fifth embodiment, where the ventilated brake rotor has a brake disk bell and a braking band made in one piece.
Figure 14:
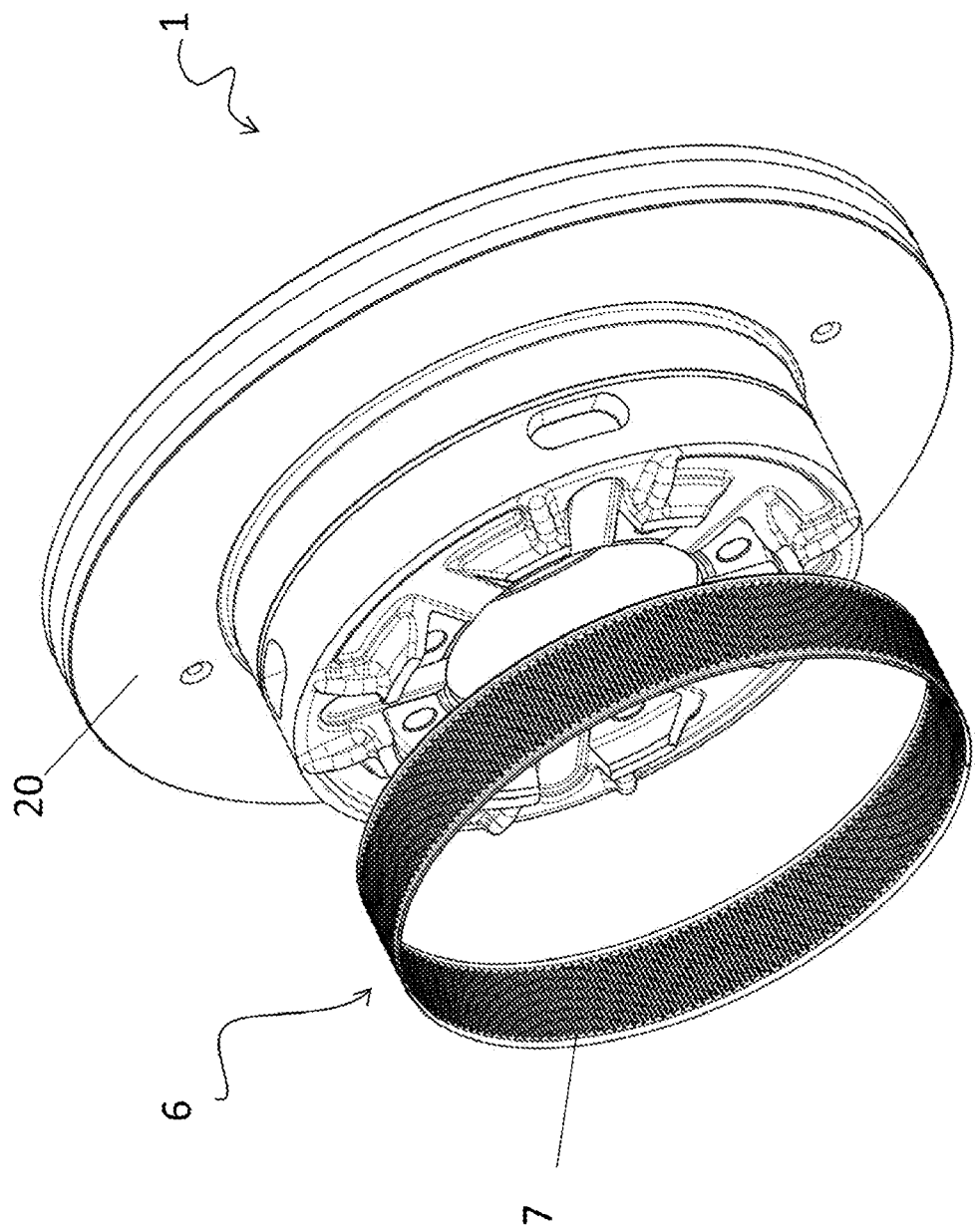
FIG. 14 is an exploded axonometric view of the ventilated brake rotor in FIG. 13.
Figure 15:
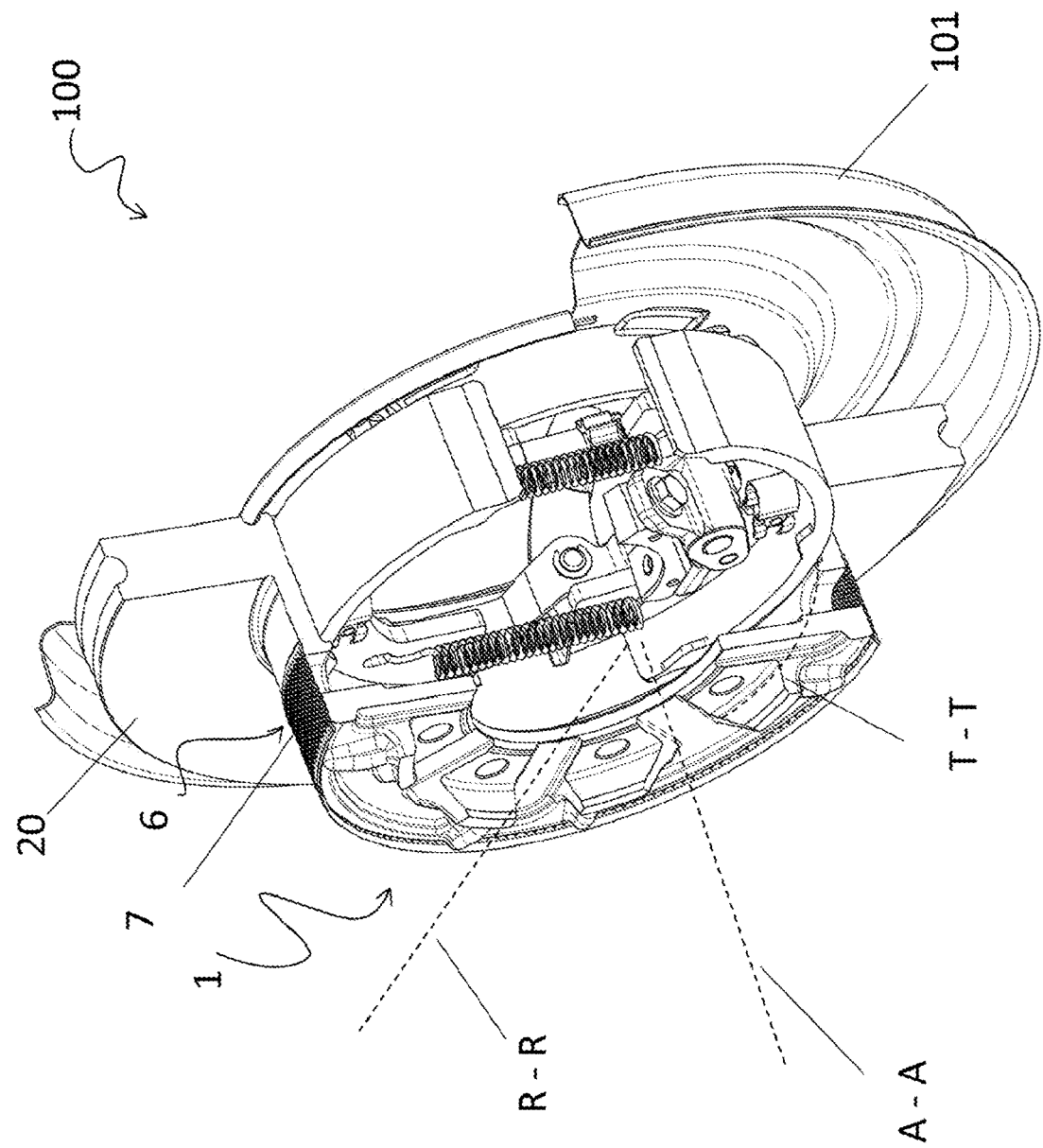
FIG. 15 is a partially sectioned axonometric view of the ventilated brake rotor in FIG. 13 associated with a drum brake of the drum-in-hat type.

According to an embodiment, the protective element 6 is a cylindrical annular protective element 7, as shown in FIG. 1, FIG. 9 and FIG. 13, for example.

According to an embodiment, the cylindrical annular protective element 7 comprises an axially front coupling portion 14 and an axially rear coupling portion 15. Where the cylindrical annular element has a central axis coinciding with the rotation axis A.

Figure 4:
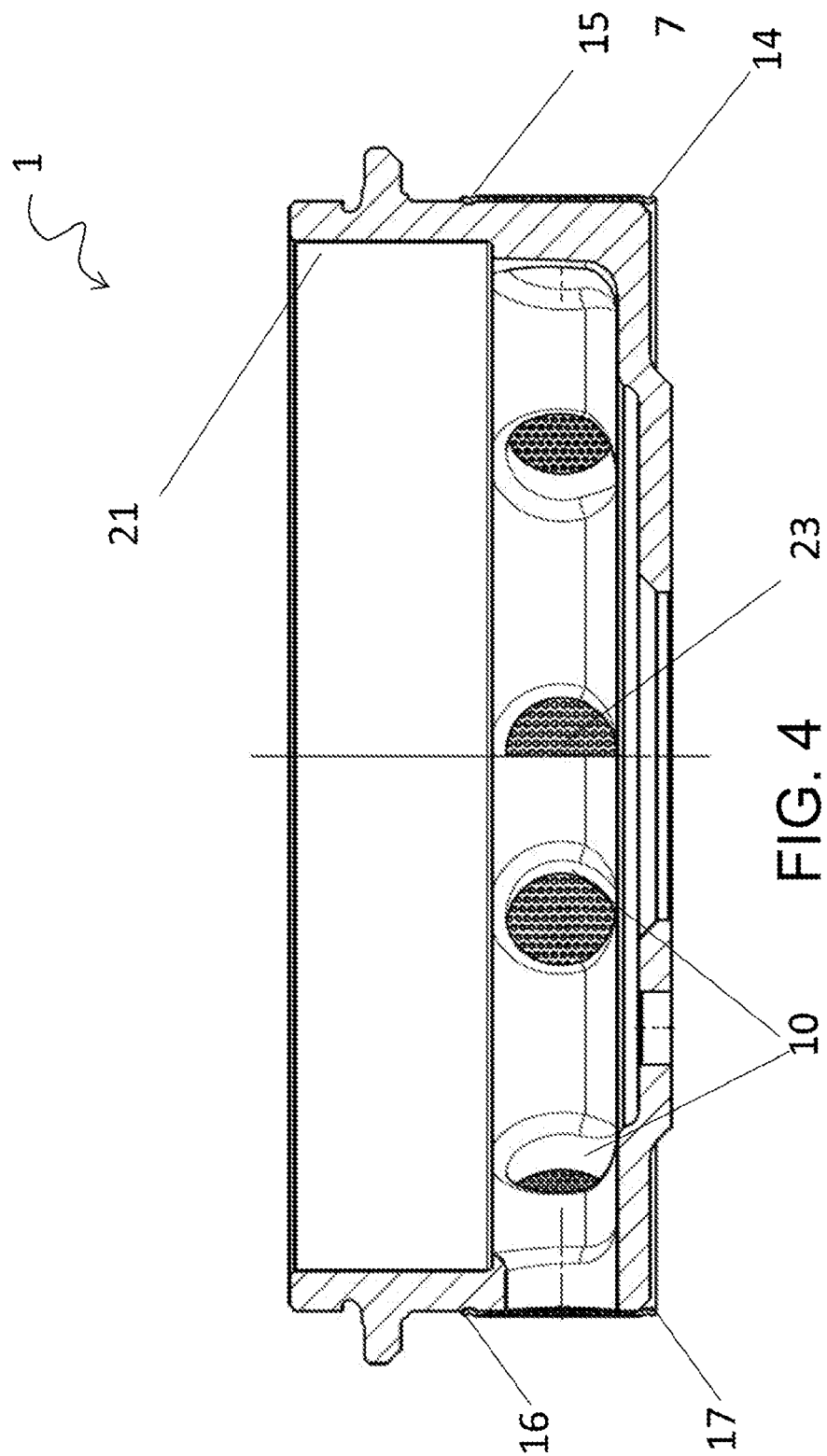
FIG. 4 shows a top view of the ventilated brake rotor in FIG. 1 sectioned along line c-c in FIG. 3.
Figure 16:
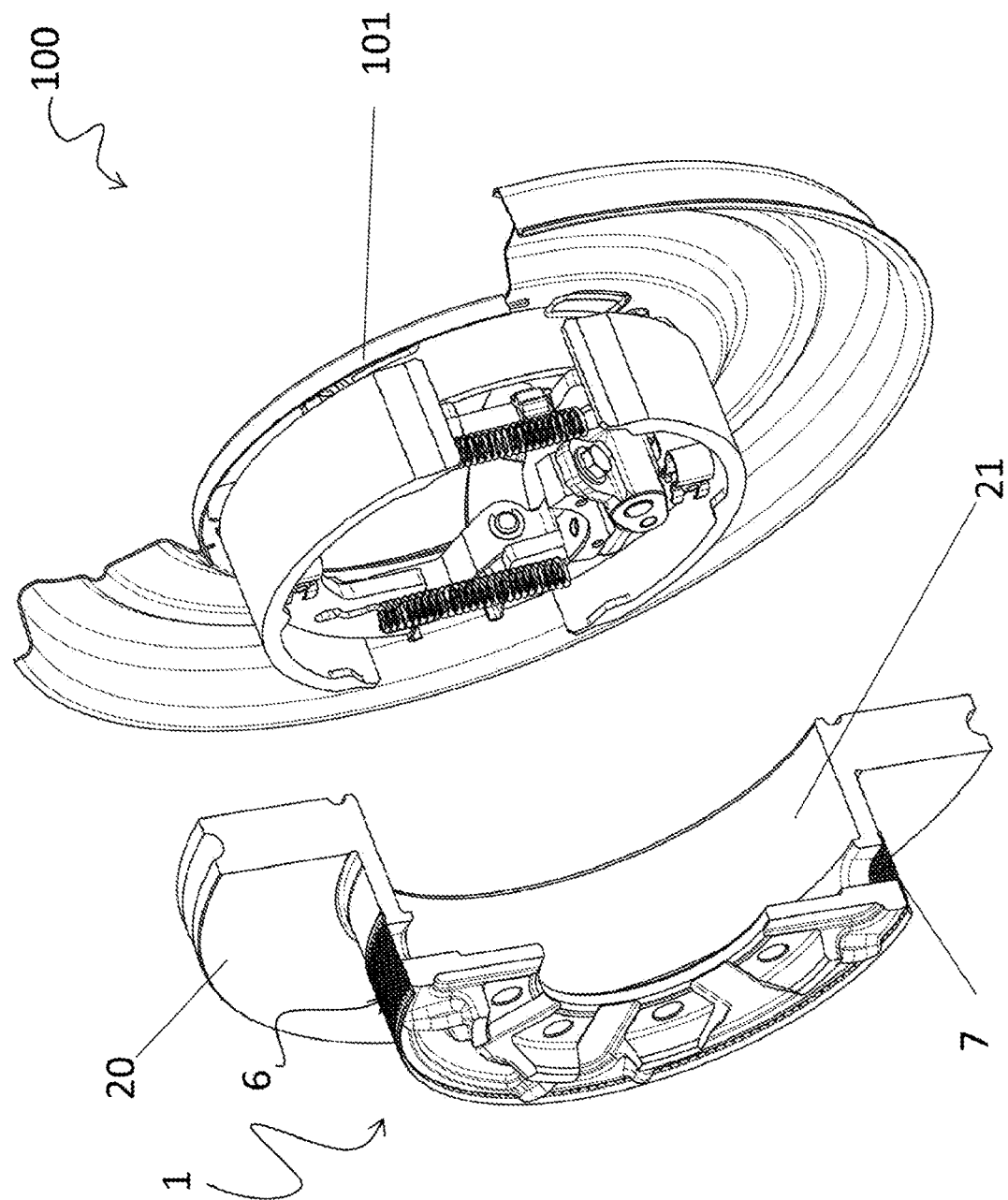
FIG. 16 is an axonometric view of the drum-in-hat brake in FIG. 15.
Figure 17:
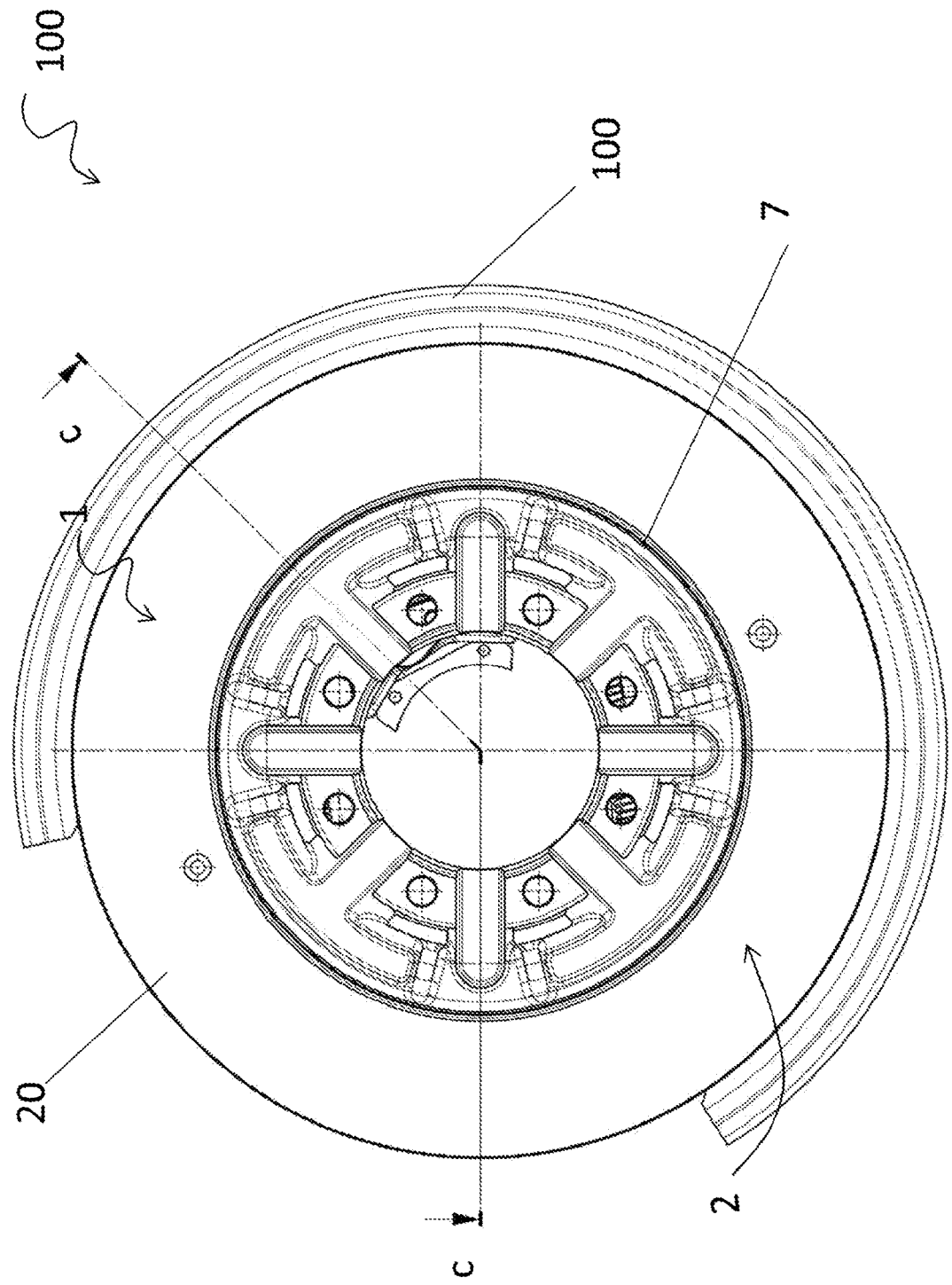
FIG. 17 shows a front view of the drum-in-hat brake in FIG. 15, which has the ventilated brake rotor in FIG. 13.
Figure 18:
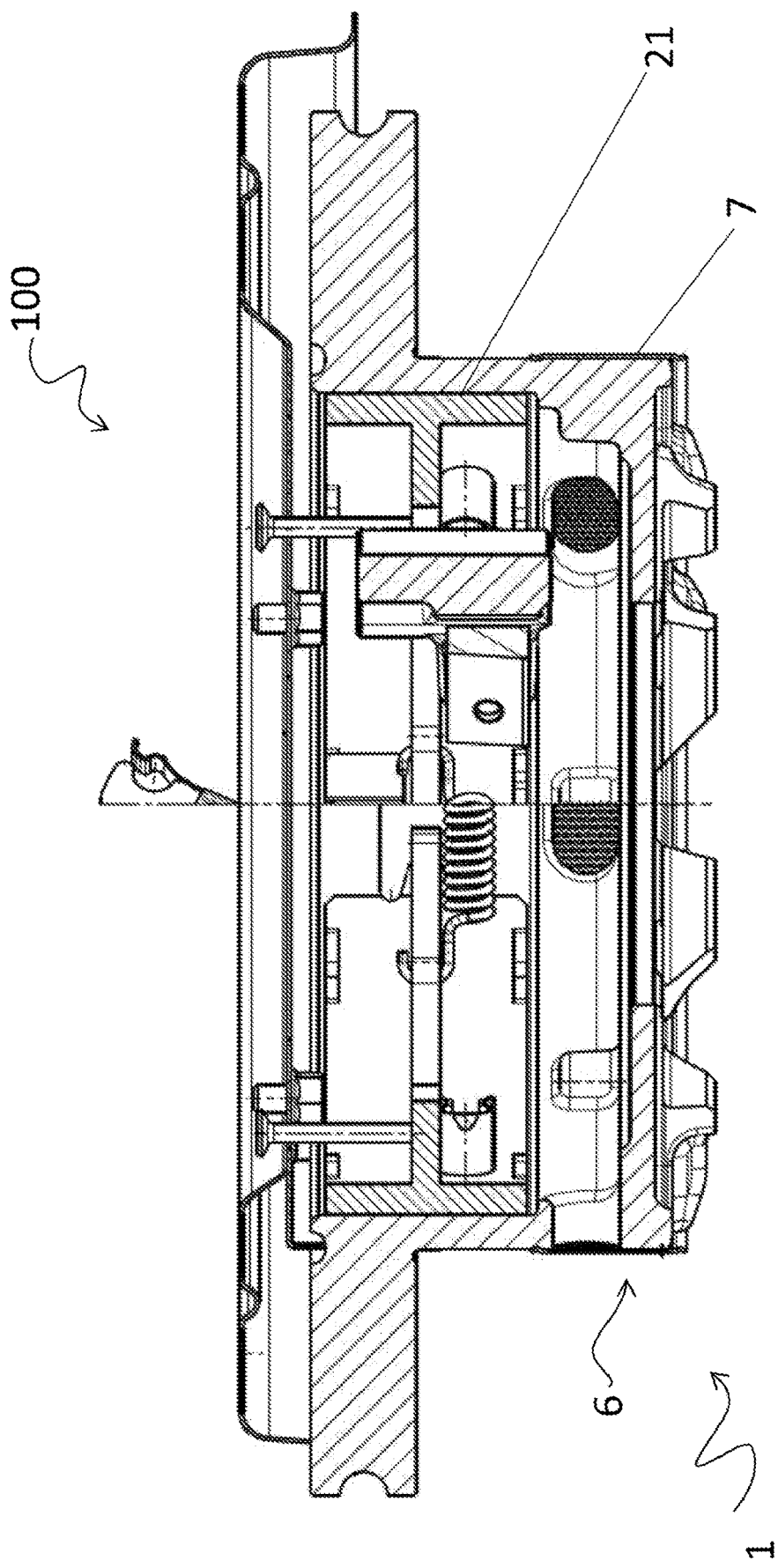
FIG. 18 shows a top view of the drum-in-hat brake in FIG. 15 sectioned along line c-c in FIG. 17.

According to an embodiment, said axially front coupling portion 14 and said axially rear coupling portion 15 are shaped annular coupling portions, as can be seen in FIG. 4 and FIG. 16, for example.

According to an embodiment, where said cylindrical crown 9 comprises an axially rear connection seat 16 and an axially front connection seat 17.

According to an embodiment, said axially rear connection seat 16 and said axially front connection seat 17 are counter-shaped annular seats with respect to the shaped annular coupling portions 14, 15 of the cylindrical annular protective element 7.

According to an embodiment, the axially front coupling portion 14 and the axially rear coupling portion 15 are connected to the axially front connection seat 17 and to the axially rear connection seat 16, respectively, so that the cylindrical annular protective element 7 is axially and radially constrained to the cup-shaped body 2.

According to an embodiment, the cylindrical annular protective element 7 is free to rotate in a circumferential direction T-T, and the coupling portions 14, 15 slide inside the respective connection seats 16, 17.

According to an embodiment, the cylindrical crown 9 comprises an axially front annular connection seat 19.

According to an embodiment, the ventilation openings 10 are axial ventilation openings passing through said radially outer circular crown 12.

Figure 5:
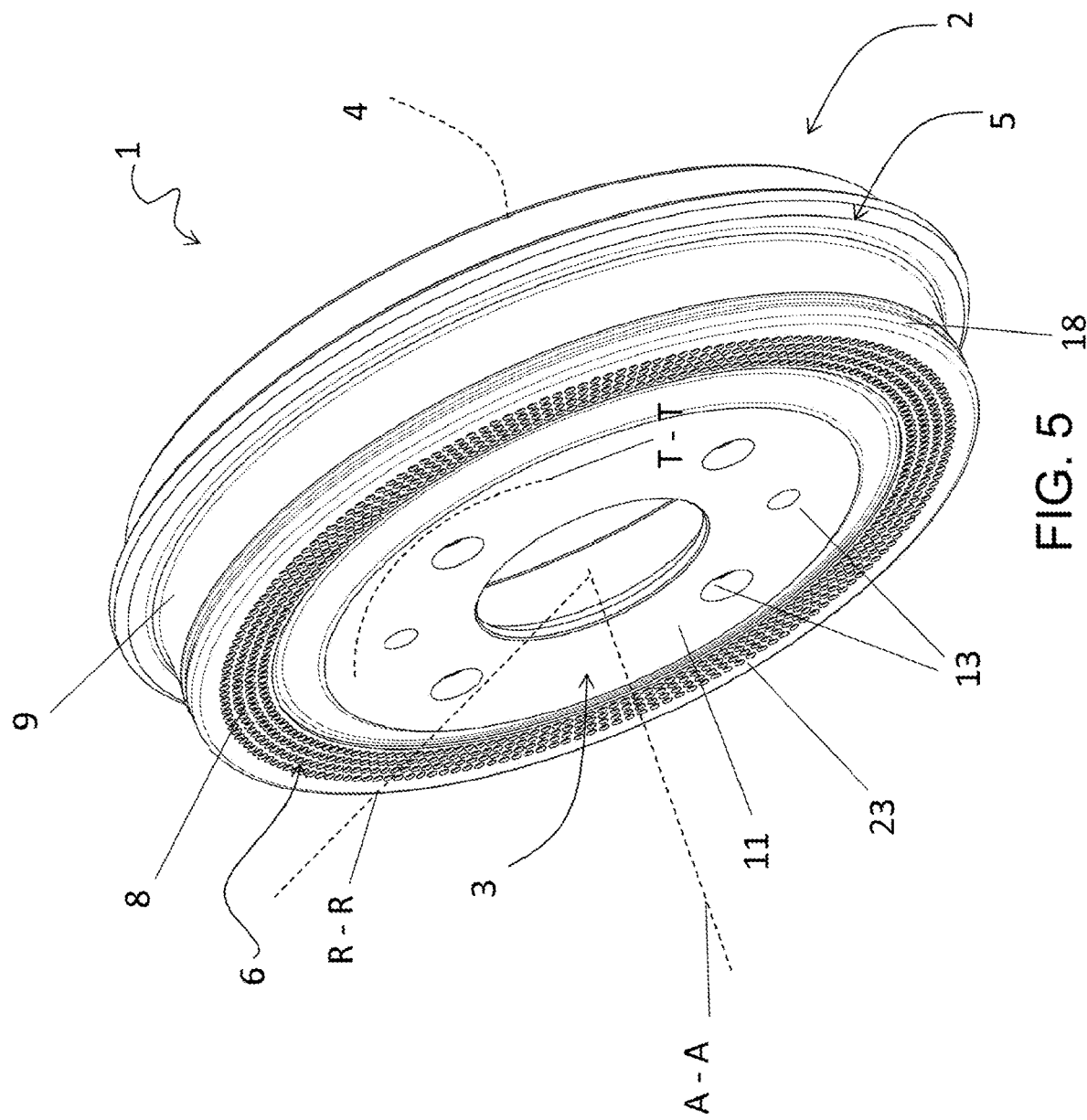
FIG. 5 is an axonometric view of a ventilated brake rotor comprising a protective element according to a second embodiment, where the ventilated brake rotor is a drum having a short drum.
Figure 6:
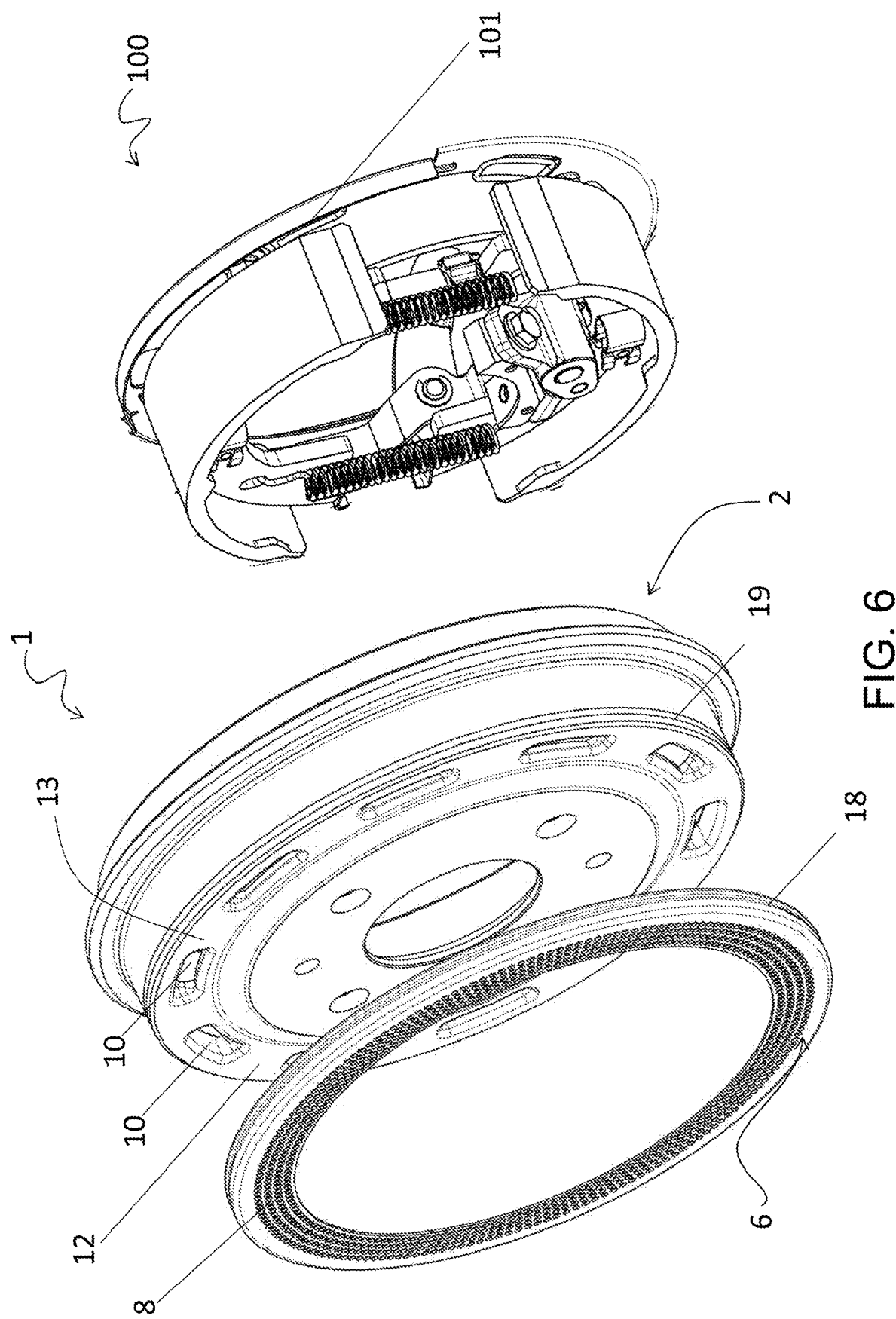
FIG. 6 is an exploded axonometric view of the ventilated brake rotor in FIG. 5 associated with a jaw holder plate of a drum brake.
Figure 7:
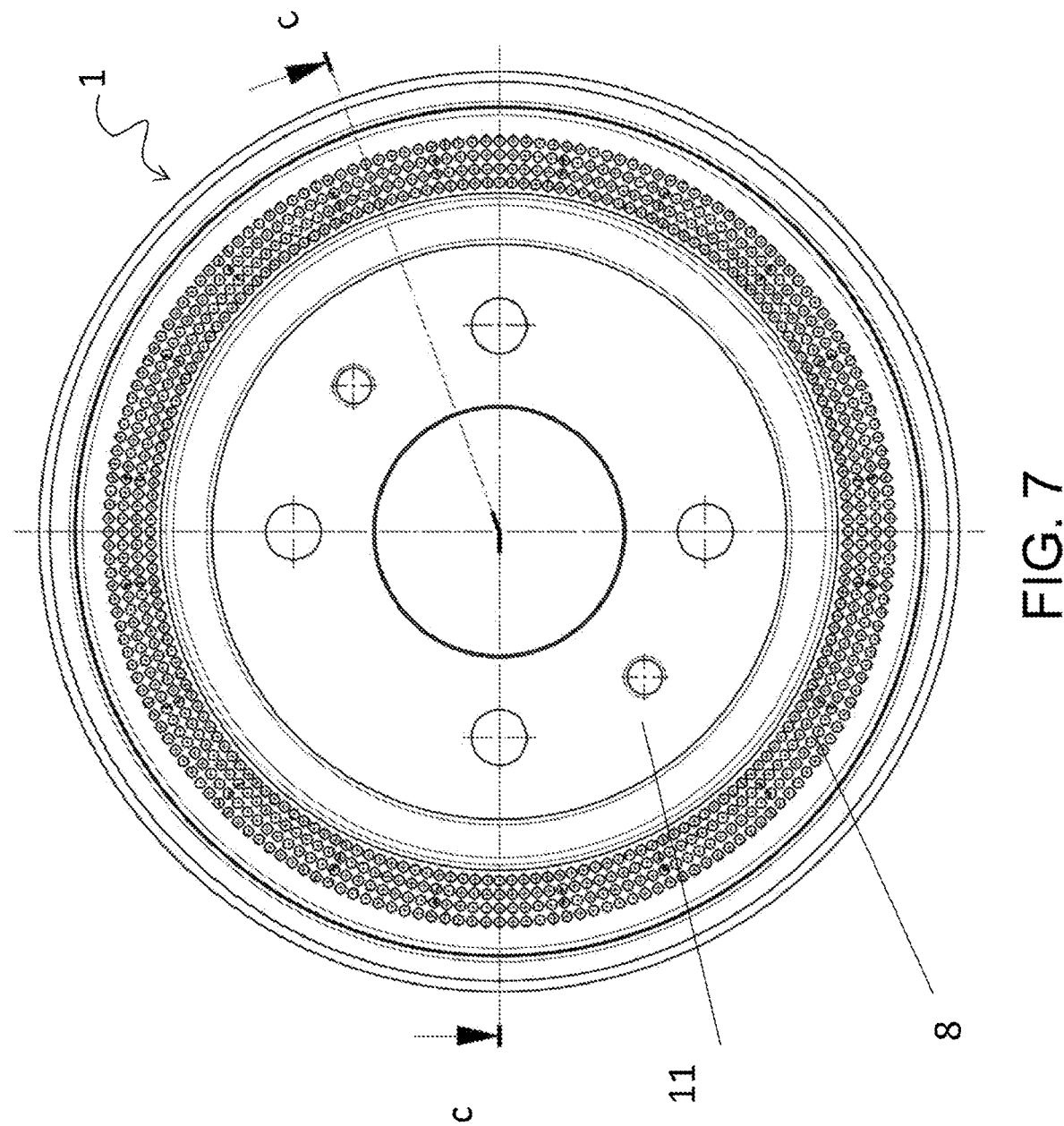
FIG. 7 is a front view of the ventilated brake rotor in FIG. 5.
Figure 11:
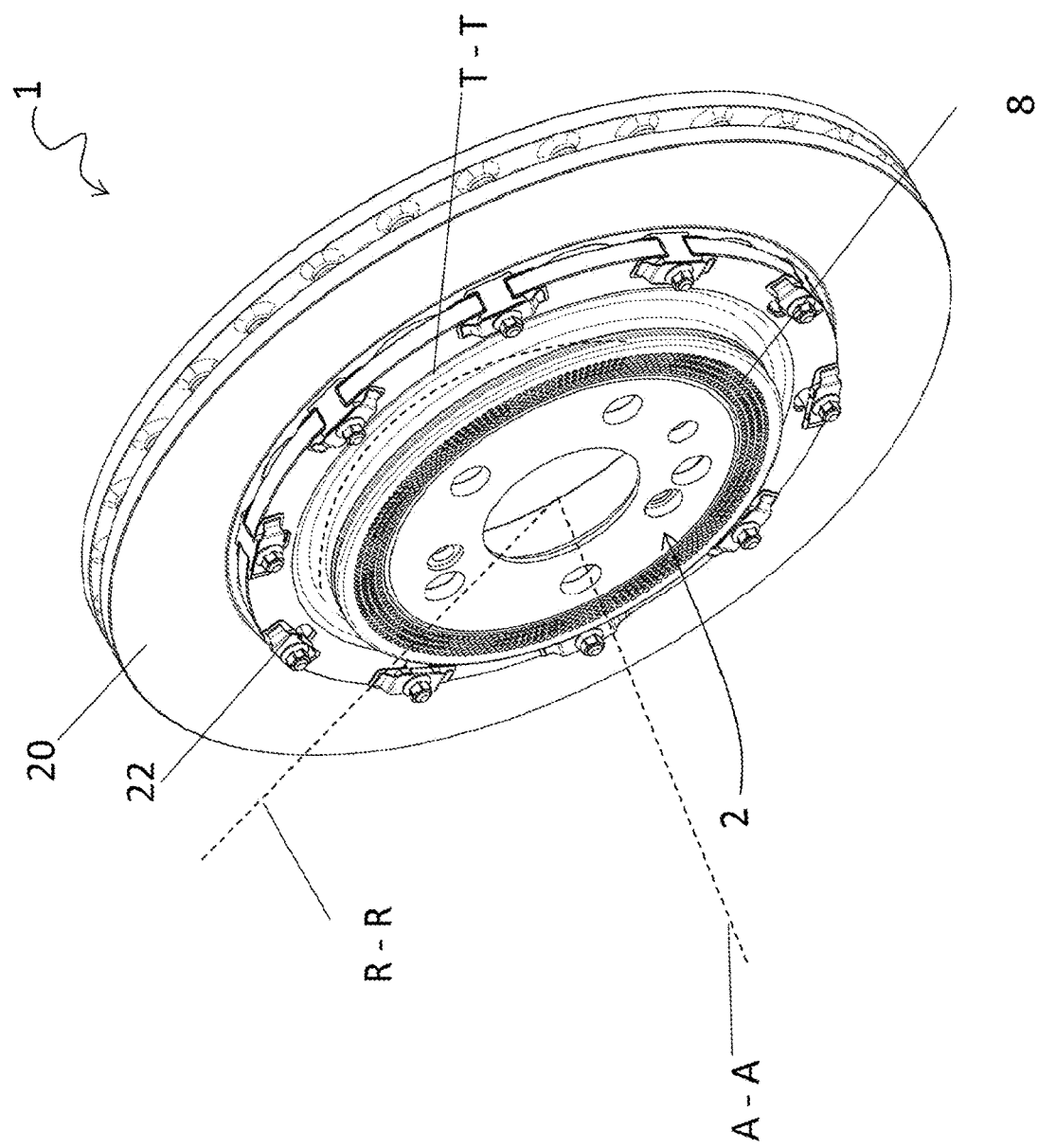
FIG. 11 is an axonometric view of a ventilated brake rotor comprising a protective element according to a fourth embodiment, where the ventilated brake rotor is a bell of a composite brake disk having a short bell.
Figure 12:
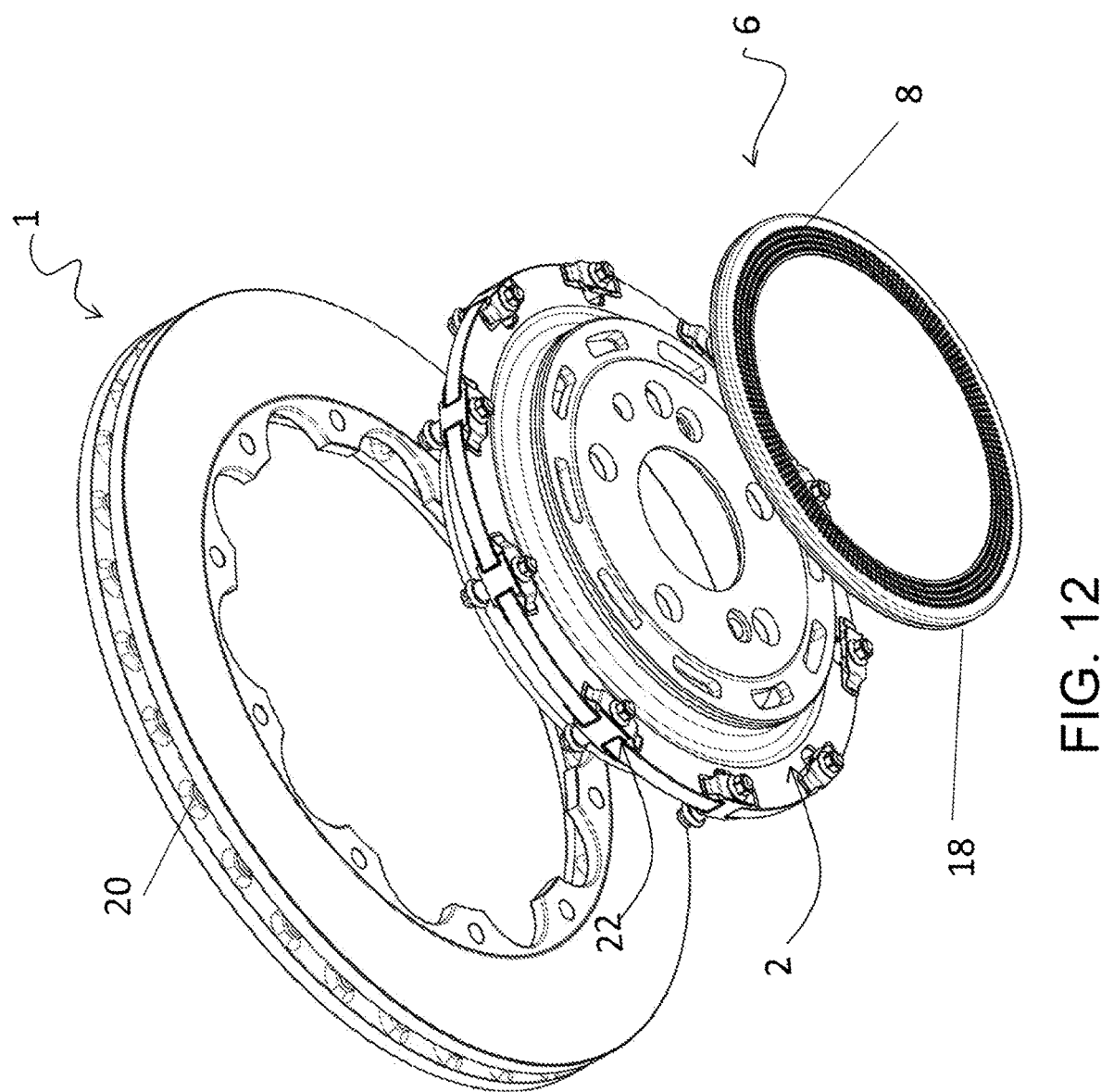
FIG. 12 is an exploded axonometric view of the ventilated brake rotor in FIG. 11.

According to an embodiment, the protective element 6 is a circular annular protective element 8, as shown in FIG. 11 and FIG. 5, for example.

According to an embodiment, the circular annular protective element 8 comprises at least one radially outer cylindrical coupling portion 18. The radially outer cylindrical coupling portion 18 extends in an axial direction from the axially front and radially outer edges of the radially outer circular crown 12. The radially outer cylindrical coupling portion 18 is connected to the axially front annular connection seat 19 so that the circular annular protective element 8 is axially and radially constrained to said cup-shaped body 2.

According to an embodiment, said ventilated brake rotor 1 comprises at least one braking band 20, 21.

According to an embodiment, the at least one braking band 20, 21 is a disk braking band 20 arranged outside the cup-shaped body 2 and extending radially from the cup-shaped body 2. In other words, the ventilated brake rotor is a brake disk.

Figure 8:
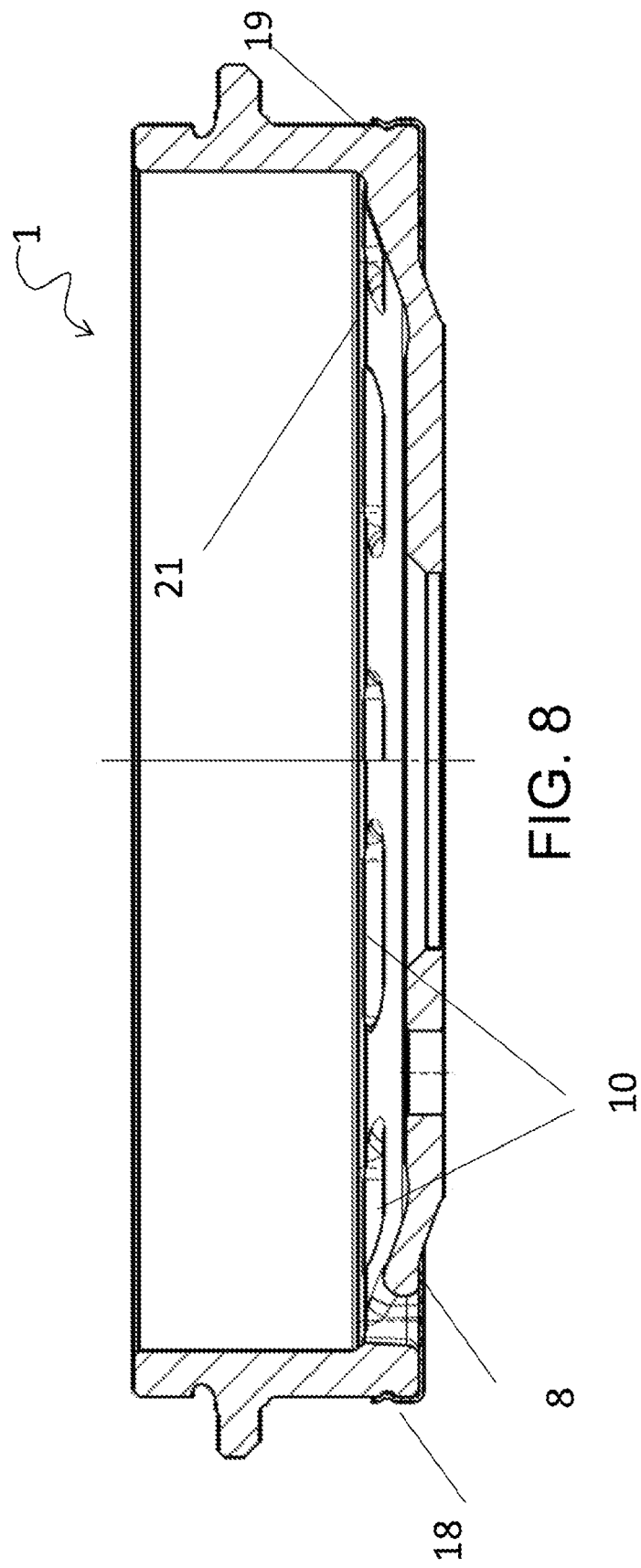
FIG. 8 shows a top view of the ventilated brake rotor in FIG. 5 sectioned along line c-c in FIG. 7.

According to an embodiment, said at least one braking band 20, 21 is a cylindrical braking band 21 arranged inside said cup-shaped body 2, as seen in FIG. 4 and FIG. 8, for example. In other words, said ventilated brake rotor is a drum of a drum brake.

According to an embodiment, said ventilated brake rotor 1 comprises said disk braking band 20 and a second braking band 20, 21 where said braking band 20, 21 is a cylindrical braking band 21 arranged inside said cup-shaped body 2, in other words, said ventilated brake rotor is a brake disk, where the cup-shaped body 2, the bell, acts as a drum of a drum brake arranged inside the cup-shaped body 2.

According to an embodiment, the ventilated brake rotor 1 comprises connection means 22 configured to constrain the cup-shaped body 2 to the disk braking band. In this case, the disk braking band 20 and the cup-shaped body 2 are made in separate pieces.

According to an embodiment, said cup-shaped body 2 and said disk braking band are made in one piece.

The present invention is also directed to a brake 100 comprising a ventilated brake rotor 1 according to one of the described embodiments.

According to an embodiment, the brake 100 is a disk brake of a vehicle.

According to an embodiment, the brake 100 is a drum brake, where said drum brake comprises a jaw support plate 101.

According to an embodiment, the brake 100 comprises a drum-in-hat brake.

The present invention is also directed to a vehicle comprising a ventilated brake rotor 1 according to one of the described embodiments.

By virtue of the present invention, it is possible to obtain a highly protective ventilated brake rotor 1 as compared to the element to be braked to which it is connected.

Due to the provision of a single-component protective element 6, it is possible to obtain the ventilated brake rotor 1 in a simple and cheap manner, which is easy to assemble.

The protective element 6 is configured to be very light, so as not to substantially increase the suspended mass of the ventilated rotor.

Advantageously, the protective element 6 is simple to remove, and therefore it can easily be replaced.

Furthermore, the provision of a protective element 6 having a plurality of ventilation holes 18, which has a shape coupling with a cup-shaped body portion, which portion comprises at least one ventilation opening 10 passing through the cup-shaped body thickness, allows the protective element 6 to be connected to the cup-shaped body 2 without using further fixing elements.

LIST OF REFERENCE NUMERALS

1 Ventilated brake rotor
2 cup-shaped body
3 front annular portion
4. rear annular edge
5 side portion
6 protective element
7 cylindrical annular protective element
8 circular annular protective element
9 cylindrical crown
10 ventilation openings
11 radially inner circular crown
12 radially outer circular crown
13 connection holes
14 axially front coupling portion
15 axially rear coupling portion
16 axially rear connection seat
17 axially front connection seat
18 radially outer cylindrical coupling portion
19 axially front annular connection seat
20 disk braking band
21 cylindrical braking band
22 connection means
100 brake
101 jaw support plate

The invention claimed is:

1. A ventilated brake rotor rotationally associated with a vehicle element to be braked,
wherein said ventilated brake rotor has a rotation axis (A),
wherein said ventilated brake rotor defines an axial direction (A-A), parallel to, or coinciding with, the rotation axis (A), a radial direction (R-R) and a circumferential direction (T-T), wherein said radial direction (R-R) is perpendicular to said axial direction (A-A) and wherein said circumferential direction (T-T) is perpendicular to both said axial direction (A-A) and said radial direction (R-R),
wherein said ventilated brake rotor comprises a cup-shaped body, wherein said cup-shaped body comprises at least one ventilation opening, wherein said at least one ventilation opening passes through a cup-shaped body thickness to allow passage of a cooling fluid for cooling said ventilated brake rotor,
wherein said cup-shaped body comprises at least one front annular portion, and a side portion,
wherein said at least one front annular portion is configured to connect the ventilated brake rotor to said vehicle element to be braked,
wherein said side portion extends from the at least one front annular portion at least in the axial direction (A-A), and
wherein the ventilated brake rotor further comprises
a protective element configured to shield said at least one ventilation opening preventing foreign bodies from entering into said cup-shaped body, and allowing the cooling fluid to cross said at least one ventilation opening,
wherein said protective element is a separable piece selectively removable from said cup-shaped body via a snap-fit, wherein the snap-fit enables rotation of the protective element with respect to the cup-shaped body.

2. The ventilated brake rotor of claim 1, wherein said cup-shaped body has a cup-shaped body thickness, and wherein said protective element has a protective element thickness, wherein the protective element thickness is smaller than said cup-shaped body thickness, and wherein at least one of the following features applies:
said at least one ventilation opening is an opening of large dimensions, wherein said opening of large dimensions is an opening passing through the cup-shaped body thickness, wherein said protective element is arranged to partially cover said at least one ventilation opening transforming said opening of large dimensions into a plurality of openings of smaller dimensions;
said protective element is configured to increase drawing of said cooling fluid from an interior to an exterior of said cup-shaped body through said at least one ventilation opening;
said protective element comprises a plurality of ventilation holes.

3. The ventilated brake rotor of claim 1, wherein at least one of the following features applies:
said protective element comprises a perforated metal sheet,
said protective element comprises at least one portion having a warp and weft configuration,
said protective element is made of a metal material,
said protective element is made of a composite material.

4. The ventilated brake rotor of claim 1, wherein said side portion comprises at least one cylindrical crown, wherein said at least one front annular portion comprises a radially inner circular crown and a radially outer circular crown, wherein said radially inner circular crown comprises a plurality of connection holes configured to connect said ventilated brake rotor to said vehicle element to be braked, wherein said cup-shaped body comprises a plurality of ventilation openings, wherein said protective element is an annular protective element, and wherein said annular protective element and said cup-shaped body have a shape coupling to be axially and radially constrained, covering said ventilation openings.

5. The ventilated brake rotor of claim 4, wherein said ventilation openings are radial ventilation openings neatly arranged in the circumferential direction (T-T), wherein said at least one cylindrical crown comprises said radial ventilation openings, wherein said protective element is a cylindrical annular protective element, wherein said cylindrical annular protective element comprises an axially front coupling portion and an axially rear coupling portion, wherein said at least one cylindrical crown comprises an axially rear connection seat and an axially front connection seat, wherein said axially front coupling portion and said axially rear coupling portion are connected to said axially front connection seat and to said axially rear connection seat, respectively, so that said cylindrical annular protective element is axially and radially constrained to said cup-shaped body.

6. The ventilated brake rotor of claim 4, wherein said ventilation openings are axial ventilation openings neatly arranged in the circumferential direction (T-T), wherein said radially outer circular crown comprises said axial ventilation openings, wherein said protective element is a circular annular protective element, wherein said circular annular protective element comprises at least one radially outer cylindrical coupling portion, wherein said at least one cylindrical crown comprises an axially front annular connection seat, wherein said radially outer cylindrical coupling portion is connected to said axially front annular connection seat so that said circular annular protective element is axially and radially constrained to said cup-shaped body.

7. The ventilated brake rotor of claim 1, wherein said ventilated brake rotor comprises at least one braking band, wherein said at least one braking band is one from:
 a disk braking band arranged outside said cup-shaped body and extending radially from said cup-shaped body,
 a cylindrical braking band arranged inside said cup-shaped body.

8. The ventilated brake rotor of claim 7, wherein said ventilated brake rotor comprises connection means, and wherein said connection means are configured to constrain said cup-shaped body to said disk braking band.

9. A brake comprising the ventilated brake rotor of claim 1.

10. The brake of claim 9, comprising a parking brake of drum-in-hat type.

11. A vehicle comprising the ventilated brake rotor of claim 1.

* * * * *